(12) United States Patent
Rembert

(10) Patent No.: US 12,387,249 B2
(45) Date of Patent: Aug. 12, 2025

(54) SYSTEMS AND METHODS FOR PRESENTING FOOD PRODUCT INFORMATION

(71) Applicant: FoodMaven, Inc., Colorado Springs, CO (US)

(72) Inventor: Jason Rembert, Superior, CO (US)

(73) Assignee: FoodMaven, Inc., Colorado Springs, CO (US)

( * ) Notice: Subject to any disclaimer, the term of this patent is extended or adjusted under 35 U.S.C. 154(b) by 240 days.

(21) Appl. No.: 18/341,520

(22) Filed: Jun. 26, 2023

(65) Prior Publication Data

US 2024/0029134 A1  Jan. 25, 2024

Related U.S. Application Data

(63) Continuation-in-part of application No. 18/090,907, filed on Dec. 29, 2022, now abandoned, which is a continuation of application No. 16/746,376, filed on Jan. 17, 2020, now abandoned.

(60) Provisional application No. 62/793,534, filed on Jan. 17, 2019.

(51) Int. Cl.
*G06Q 30/00* (2023.01)
*G06N 20/00* (2019.01)
*G06Q 30/0283* (2023.01)
*G06Q 30/0601* (2023.01)

(52) U.S. Cl.
CPC ......... *G06Q 30/0629* (2013.01); *G06N 20/00* (2019.01); *G06Q 30/0283* (2013.01); *G06Q 30/0611* (2013.01); *G06Q 30/0641* (2013.01)

(58) Field of Classification Search
CPC .................................................. G06Q 30/0629
See application file for complete search history.

(56) References Cited

U.S. PATENT DOCUMENTS

| | | |
|---|---|---|
| 7,206,756 B1 | 4/2007 | Walsky |
| 7,899,701 B1 | 3/2011 | Odom |
| 8,112,317 B1 | 2/2012 | Ballaro et al. |
| 11,443,355 B2 | 9/2022 | Rembert |
| 2001/0047293 A1 | 11/2001 | Waller et al. |

(Continued)

FOREIGN PATENT DOCUMENTS

| | | |
|---|---|---|
| CA | 2694372 | 1/2009 |
| JP | 3883135 | 2/2007 |
| JP | 2013-097765 | 5/2013 |

OTHER PUBLICATIONS

Wang, Xiaojun, and Dong Li. "A dynamic product quality evaluation based pricing model for perishable food supply chains." Omega 40.6 (2012): 906-917.*

(Continued)

*Primary Examiner* — Kathleen Palavecino
(74) *Attorney, Agent, or Firm* — Sheridan Ross P.C.

(57) ABSTRACT

Embodiments of the present disclosure relate generally to systems and methods for presenting food product information, and more particularly to electronic exchanges and computer systems enabling for comparison of food product prices between two or more suppliers of the food product. The computer systems of the invention are generally embodied in one or more servers operating one or more services. In some embodiments, the systems and methods of the invention may enable and/or facilitate purchases and sales of food products in an electronic exchange.

16 Claims, 7 Drawing Sheets

(56) References Cited

U.S. PATENT DOCUMENTS

| | | | |
|---|---|---|---|
| 2004/0117235 | A1 | 6/2004 | Shacham |
| 2008/0215349 | A1 | 9/2008 | Baran et al. |
| 2010/0211436 | A1 | 8/2010 | Checketts et al. |
| 2011/0066662 | A1 | 3/2011 | Davis |
| 2012/0253908 | A1 | 10/2012 | Ouimet et al. |
| 2013/0282438 | A1 | 10/2013 | Hunter et al. |
| 2013/0297464 | A1 | 11/2013 | Jaquez et al. |
| 2014/0122203 | A1 | 5/2014 | Johnson et al. |
| 2015/0006354 | A1* | 1/2015 | Kittelsen ................ G06Q 40/06 705/37 |
| 2016/0217509 | A1 | 7/2016 | Eggleston, IV et al. |
| 2016/0267570 | A1* | 9/2016 | Hodges .............. G06Q 30/0627 |
| 2017/0178534 | A1 | 6/2017 | Prakash et al. |
| 2017/0228683 | A1 | 8/2017 | Hu et al. |
| 2018/0165740 | A1 | 6/2018 | Jadhav et al. |
| 2018/0218414 | A1* | 8/2018 | Moghadam ........ G06Q 30/0283 |
| 2020/0160413 | A1 | 5/2020 | Rembert |
| 2020/0234356 | A1 | 7/2020 | Rembert |
| 2022/0414727 | A1 | 12/2022 | Rembert |

OTHER PUBLICATIONS

U.S. Appl. No. 18/090,907, filed Dec. 29, 2022, Rembert.

"AdaptiveBlue: The Web Your Way," AdaptiveBlue, archived webpage dated Jul. 13, 2006, retrieved from https://web.archive.org/web/20060713181801/http://www.adaptiveblue.com/features.html, 40 pages.

Li et al., "Regular Expression Learning for Information Extraction," Proceedings of the 2008 Conference on Empirical Methods in Natural Language Processing, Association for Computational Linguistics, Oct. 2008, pp. 21-30.

Wang et al., "A dynamic product quality evaluation based pricing model for perishable food supply chains," Omega, vol. 40, No. 6, Feb. 28, 2012, pp. 906-917.

Official Action for U.S. Appl. No. 16/549,751, dated Jan. 18, 2022, 6 pages. Restriction Requirement.

Notice of Allowance for U.S. Appl. No. 16/549,751, dated May 4, 2022, 15 pages.

Notice of Allowance for U.S. Appl. No. 17/896,418, dated Jul. 22, 2024, 10 pages.

Official Action for U.S. Appl. No. 16/685,549, dated May 19, 2021, 42 pages.

Official Action for U.S. Appl. No. 16/685,549, dated Oct. 27, 2021, 54 pages.

Official Action for U.S. Appl. No. 16/685,549, dated Aug. 26, 2022, 60 pages.

Official Action for U.S. Appl. No. 16/685,549, dated Mar. 17, 2023, 66 pages.

Official Action for U.S. Appl. No. 16/685,549, dated Oct. 23, 2023, 13 pages.

Official Action for U.S. Appl. No. 16/685,549, dated Jul. 5, 2024, 16 pages.

Official Action for U.S. Appl. No. 16/746,376, dated Sep. 27, 2021, 8 pages. Restriction Requirement.

Official Action for U.S. Appl. No. 16/746,376, dated Dec. 14, 2021, 18 pages.

Official Action for U.S. Appl. No. 16/746,376, dated Jun. 29, 2022, 19 pages.

* cited by examiner

| Product | Quantity | Purchase Frequency | Characteristics | Price Notify | Local Notify | Brand Pref |
|---|---|---|---|---|---|---|
| Ground Beef | 1 lb | Weekly | Fresh,Non-GMO | ☑ | ☑ | None |
| Chicken Breast | 6 | Weekly | Brown,Organic | ☑ | ☑ | Tyson |
| Eggs | Dozen | Weekly | 2%,Organic | ☑ | ☑ | None |
| Milk | 1 Gallon | Weekly | Yellow | ☑ | ☑ | None |
| Onions | 1 | Weekly | Red | | ☑ | None |
| Bell Pepper | 1 | Weekly | | | | |
| Olive Oil | 24 oz | Monthly | Extra Virgin | | | Bertolli |

FIG. 4

| Product Desc | Store | Packaging | Quantity | Price | Total |
|---|---|---|---|---|---|
| Sangral Beef Ground Beef Frozen,Grass Fed,Non-GMO | Sangral Beef | 1 lb | 1 | $1.49 / lb | $1.49 |
| Chicken Breast Fresh,Non-GMO | FoodMaven | 6 | 1 | $1.12 / lb | $1.12 |
| Signature Farm Eggs Brown,Organic | Safeway | Dozen | 1 | $2.11 | $2.11 |
| Natures Preserve Milk 2%,Organic | Whole Foods | 1 Gallon | 1 | $3.68 | $3.68 |
| Onions Yellow | FoodMaven | 1 | 3 | $0.78 each | $2.34 |
| Bell Pepper Red | Target | 1 | 2 | $0.67 each | $1.34 |
| Olive Oil Extra Virgin | Whole Foods | 24oz | 1 | $7.20 | $7.20 |

Order Total $19.28

○ Deliver
○ Pickup

[Submit Order] [Save for Later] [Save to PDF]

FIG. 6

SYSTEMS AND METHODS FOR PRESENTING FOOD PRODUCT INFORMATION

CROSS-REFERENCE TO RELATED APPLICATION

This application is a continuation-in-part of U.S. patent application Ser. No. 18/090,907, filed 29 Dec. 2022, which is a continuation of U.S. patent application Ser. No. 16/746,376, filed 17 Jan. 2020, which claims the benefit of U.S. Provisional Patent Application 62/793,534, filed 17 Jan. 2019, the entireties of all of which are incorporated herein by reference.

FIELD OF THE INVENTION

Embodiments of the present disclosure relate generally to systems and methods for changing the paradigm of food shopping from buyers seeking food to food seeking buyers, and more particularly to automated tools enabling the collection and presentation of comprehensive food availability and pricing, including surplus food and food that is available from local farmers and ranchers. The computer systems of the invention generally comprise at least a graphical user interface (GUI) and a food product sourcing application programming interface (API) or service.

BACKGROUND OF THE INVENTION

Lost food, defined in general terms as food that fails to be used for good purpose, represents an economic loss of at least $200 billion per year in the United States alone. Food loss can have many causes, including but not limited to ordering errors, cancellations of purchases or sales at short notice, cosmetic blemishes, and so on.

Because many food products are perishable, owners of excess or unsold food have very little time to sell or donate this food, and as a result, enormous quantities of food are simply thrown away and sent to landfills. Meanwhile, more than 42 million Americans do not get enough to eat, more than 38 million receive government food purchasing assistance (which they must use to purchase food at full retail prices), and at least 23.5 million live in food deserts where convenience stores may be the only option for purchasing food.

At present, there are few or no effective, reliable, well-known mechanisms in place by which supermarkets, wholesale food distributors, or farmers and ranchers can quickly find potential buyers for excess food. This represents a significant lost opportunity for both consumers and producers of food: consumers desire lower prices on fresh and/or local food products, and producers, who frequently have no other option for disposing of excess food besides simply discarding it, are often willing to sell excess food even at significant discounts.

Additionally, regular buyers of large quantities of food, such as restaurants, hotels, hospitals, prisons, and schools, are generally uninformed or underinformed as to prevailing prices for a given food product, in a given geographic location, and/or at a given time of year. This is due to an intentional lack of pricing transparency in the food distribution industry; a more transparent system of food pricing would improve the efficiency of purchasing and sale decisions and would result in prices that respond more rationally to changing conditions, and possibly to lower prices for buyers overall. This could also lead to a resurgence in local farming and a reduction of food waste as food buyers are made aware of all food options available to them.

There is thus a need in the art for systems and methods that quickly and reliably provide buyers with comparative food product data and/or an identification of the lowest price for one or more given food products in the buyer's vicinity, and preferably an identification of the seller offering the lowest price for each of the one or more food products; such systems and methods would preferably present information pertaining to lost and/or local food in addition to other sources of food products. It is further advantageous for such systems and methods to facilitate the purchase and sale of food products based on the comparative food product data provided.

SUMMARY OF THE INVENTION

It is one aspect of the present invention to provide a method for displaying, on a graphical user interface (GUI), comparative food product data relating to and facilitating trading of a food product, comprising (a) receiving, by a food product sourcing server, a request for food product market information comprising a food product description; (b) authenticating, by an authentication server, the request according to a secure authentication algorithm; (c) parsing, by a list server, the request to identify one or more request parameters contained within the request; (d) normalizing, by the list server, the one or more request parameters; (e) constructing, by the food product sourcing server, one or more data structures, the one or more data structures collectively comprising the normalized request parameters; (f) storing, by the food product sourcing server, the one or more data structures in a computer memory; (g) applying, by a food product catalog server, a set of logical filtering elements to the normalized request parameters in the one or more data structures to produce filtered food product data, the filtered food product data comprising a food product identifier and an identifier corresponding to a food product supplier; (h) applying, by a food pricing server, an algorithm to the food product identifier and the identifier corresponding to the food product supplier to produce a food product price corresponding to the food product and the food product supplier; (i) dynamically and selectively displaying, by the food product sourcing server, a first indicator and concealing or displaying a second indicator in a first location of the graphical user interface corresponding to the food product, the first indicator corresponding to the food product price and the second indicator corresponding to another characteristic of the food product; (j) selectively displaying, by the food product sourcing server, a first region operable by a user input device in the first location; (k) in response to operation of the first region by the user input device, setting, by the food product sourcing server, a plurality of parameters for a purchase order relating to the food product and displaying a second region operable by a user input device in a second location in the graphical user interface corresponding to the food product; and (l) in response to operation of the second region by the user input device, adding, by the food product sourcing server, an electronic exchange as a node to a network and providing, via the network, the purchase order to the electronic exchange, wherein at least one of steps (c) and (d) comprises one or more sub-steps selected from the group consisting of (i) matching keywords in the food product description to a known food taxonomy or set of food characteristics, (ii) applying regular expression pattern matching to parse a package weight parameter or package size parameter from the food product description, (iii) applying a machine learning word vector algorithm to identify a category of food products with which the food product description matches, and (iv) utilizing a large language model to identify a category of food products with which the food product description matches.

In embodiments, at least two of the food product sourcing server, the authentication server, the list server, the food product catalog server, and the food pricing server may be the same server.

In embodiments, each of the food product sourcing server, the authentication server, the list server, the food product catalog server, and the food pricing server may be a separate server.

In embodiments, the authentication algorithm may be selected from the group consisting of OAuth and SAML.

In embodiments, at least one of the one or more request parameters may be selected from the group consisting of a food product name, a food product price class, a date, a season, a food product weight, a food product age, a food product quality parameter, and a geographic identifier.

In embodiments, at least a portion of the set of logical filtering elements applied in step (g) may be contained in a lookup table stored in a computer memory, and/or the algorithm applied in step (h) may comprise using a lookup table stored in a computer memory.

In embodiments, the algorithm of step (h) may comprise a machine learning algorithm. The machine learning algorithm may, but need not, be selected from the group consisting of TensorFlow, NaiveBayes, Logistic Regression, and Random Forest.

It is another aspect of the present invention to provide a computer system for facilitating trading of a food product, comprising a processor; and a memory coupled with and readable by the processor and storing therein a set of instructions which, when executed by the processor, causes the processor to facilitate trading of a food item by (a) receiving, by a food product sourcing server, a request for food product market information comprising a food product description; (b) authenticating, by an authentication server, the request according to a secure authentication algorithm; (c) parsing, by a list server, the request to identify one or more request parameters contained within the request; (d) normalizing, by the list server, the one or more request parameters; (e) constructing, by the food product sourcing server, one or more data structures, the one or more data structures collectively comprising the normalized request parameters; (f) storing, by the food product sourcing server, the one or more data structures in a computer memory; (g) applying, by a food product catalog server, a set of logical filtering elements to the normalized request parameters in the one or more data structures to produce filtered food product data, the filtered food product data comprising a food product identifier and an identifier corresponding to a food product supplier; (h) applying, by a food pricing server, an algorithm to the food product identifier and the identifier corresponding to the food product supplier to produce a food product price corresponding to the food product and the food product supplier; (i) dynamically and selectively displaying, by the food product sourcing server, a first indicator and concealing or displaying a second indicator in a first location of the graphical user interface corresponding to the food product, the first indicator corresponding to the food product price and the second indicator corresponding to another characteristic of the food product; (j) selectively displaying, by the food product sourcing server, a first region operable by a user input device in the first location; (k) in response to operation of the first region by the user input device, setting, by the food product sourcing server, a plurality of parameters for a purchase order relating to the food product and displaying a second region operable by a user input device in a second location in the graphical user interface corresponding to the food product; and (l) in response to operation of the second region by the user input device, adding, by the food product sourcing server, an electronic exchange as a node to a network and providing, via the network, the purchase order to the electronic exchange, wherein at least one of steps (c) and (d) comprises one or more sub-steps selected from the group consisting of (i) matching keywords in the food product description to a known food taxonomy or set of food characteristics, (ii) applying regular expression pattern matching to parse a package weight parameter or package size parameter from the food product description, (iii) applying a machine learning word vector algorithm to identify a category of food products with which the food product description matches, and (iv) utilizing a large language model to identify a category of food products with which the food product description matches.

In embodiments, at least two of the food product sourcing server, the authentication server, the list server, the food product catalog server, and the food pricing server may be the same server.

In embodiments, each of the food product sourcing server, the authentication server, the list server, the food product catalog server, and the food pricing server may be a separate server.

In embodiments, the authentication algorithm may be selected from the group consisting of OAuth and SAML.

In embodiments, at least one of the one or more request parameters may be selected from the group consisting of a food product name, a food product price class, a date, a season, a food product weight, a food product age, a food product quality parameter, and a geographic identifier.

In embodiments, at least a portion of the set of logical filtering elements applied in step (g) may be contained in a lookup table stored in a computer memory, and/or (ii) the algorithm applied in step (h) may comprise using a lookup table stored in a computer memory.

In embodiments, the algorithm of step (h) may comprise a machine learning algorithm. The machine learning algorithm may, but need not, be selected from the group consisting of TensorFlow, NaiveBayes, Logistic Regression, and Random Forest.

It is another aspect of the present invention to provide a network, comprising a server, comprising at least one microprocessor and a network interface for electronic communications via the network; at least one microprocessor of the server executing a food product sourcing service; at least one microprocessor of the server executing an authentication service; at least one microprocessor of the server executing a food product catalog service; and at least one microprocessor of the server executing a food pricing service, wherein the food product sourcing service is operable to receive, from an application running on a requestor computer, a data structure comprising a request for pricing data of at least one food product, wherein the request comprises at least one request parameter selected from the group consisting of a food product name, a food product price class, a date, a season, a food product weight, a food product age, a food product quality parameter, and a geographic identifier, wherein the food product sourcing service is operable to parse the data structure for user credentials and, if the food product sourcing service identifies user credentials, communicate the user credentials to the authentication service, wherein the authentication service is operable to validate the user credentials with an authentication protocol and, if the authentication service validates the user credentials, communicate a validation to the food product sourcing service, wherein the food product sourcing service is operable to parse the request for food product data and user data and, if the food product sourcing service identifies food product data and user data, normalizes the food product data and communicates the normalized food product data to the food product catalog service, wherein at least one of the parsing and the normalizing comprises one or more substeps selected from the group consisting of (i) matching keywords in the food product description to a known food taxonomy or set of food characteristics, (ii) applying regular expression pattern matching to parse a package weight parameter or package size parameter from the food product description, (iii) applying a machine learning word vector algorithm to identify a category of food products with which the food product description matches, and (iv) utilizing a large language model to identify a category of food products with which the food product description matches, wherein the food product catalog service is operable to apply a set of logical filtering elements to the normalized food product data to produce filtered food product data, the filtered food product data comprising a food product identifier and an identifier corresponding to a food product supplier, and communicate the filtered food product data to the food product sourcing service, wherein the food product sourcing service is operable to communicate the filtered food product data to the food pricing service, wherein the food pricing service executes a first algorithm using the food product identifier and the identifier corresponding to the food product supplier to produce a food product price corresponding to the food product and the food product supplier and communicate the food product price to the food product sourcing service, and wherein the food product sourcing service is operable to add the requestor computer as a node to the network and selectively, according to a second algorithm, display an indicator corresponding to the food product price in a graphical user interface of the application running on the requestor computer.

In embodiments, the authentication protocol may be selected from the group consisting of OAuth and SAML.

In embodiments, the first algorithm may comprise using a lookup table stored in a computer memory.

In embodiments, the first algorithm may comprise a machine learning algorithm.

BRIEF DESCRIPTION OF THE DRAWINGS

FIG. 4 is a first exemplary instantiation of a graphical user interface (GUI) of a web or mobile application, according to embodiments of the present invention.

FIG. 6 is a third exemplary instantiation of a graphical user interface (GUI) of a web or mobile application, according to embodiments of the present invention.

Figure 1:
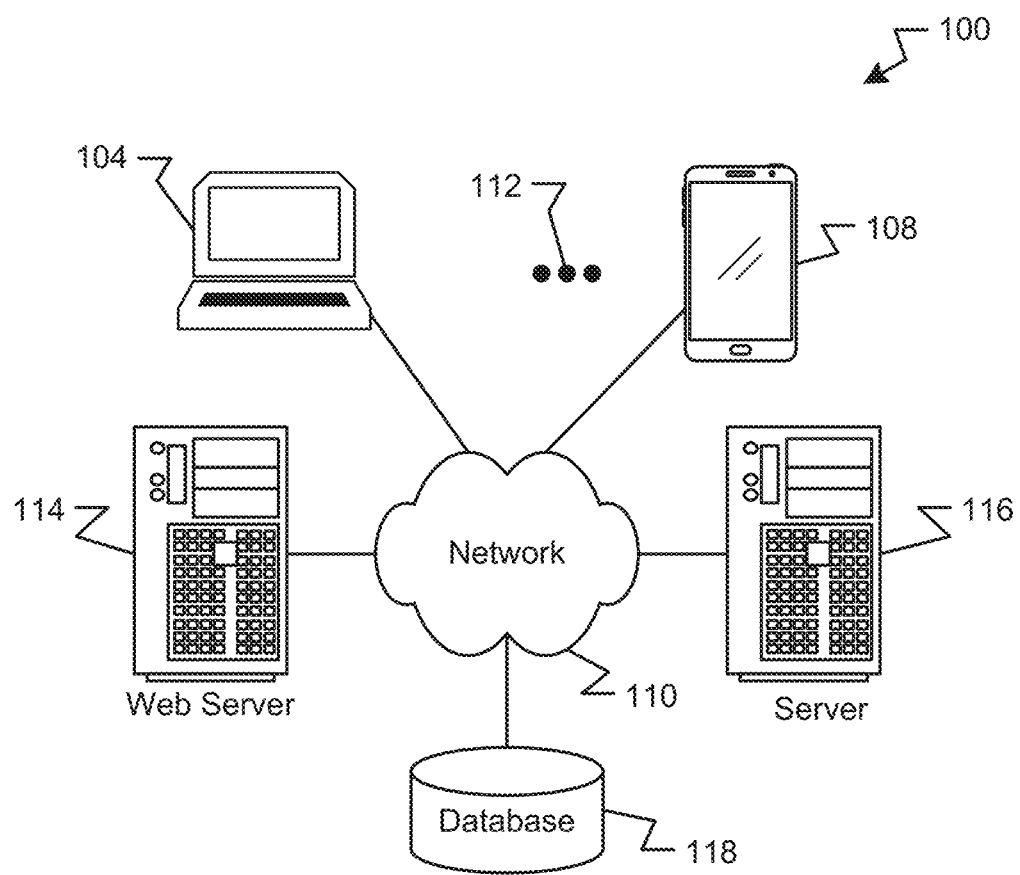
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

As used herein, the terms "primary market" and "primary food market" are interchangeable and each refer to conventional wholesale or retail markets for the purchase and sale of food products. By way of non-limiting example, farmers, ranchers, grocery stores, and commercial food services are generally sellers in the primary market, and individuals, restaurants, caterers, hospitals, prisons, and schools are generally buyers in the primary market.

As used herein, the terms "excess food" and "lost food" refer to any food product that cannot be sold on the primary market, or that has already been sold on the primary market but whose purchaser on the primary market desires to resell.

As used herein, the terms "secondary market" and "secondary food market" are interchangeable and each refer to markets for the purchase and sale of excess food.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments®

Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. In additional embodiments, the disclosed methods may be implemented in conjunction with functional programming. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on a personal computer or a mobile device (e.g. a smartphone or tablet), such as an applet, JAVA® or CGI script, Web application in a browser or as a resource residing on a server, computer workstation, or personal mobile device, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for collection and presentation of price data for a food product and comparison of prices for food products from different sources. Generally speaking, embodiments described herein provide computer-based tools and systems by which food buyers can obtain prices of one or more food products from each of a plurality of sellers, as well as electronic exchanges and computer systems enabling the purchase and sale of food products based on comparative food product data. The computer systems of the invention generally comprise at least a user-operable application having a graphical user interface (GUI) and a food product sourcing service. More specifically, preferred embodiments comprise a website and/or mobile application, a food product sourcing service, an authentication service, a shopping list upload service, a food product catalog service, a food pricing service, a product upload service, a repository of food product data, a repository of food product sourcing data, and a repository of food product pricing data. Any one or more of the services provided by the system may take the form of an application programming interface (API). The various components of systems of the present disclosure collectively enable potential buyers of food to evaluate and compare prices of one or more food products from each of a plurality of food sellers or other sources, and to purchase food products based on a combination of food product data and food product pricing data.

Various additional details of embodiments of the present disclosure will be described below with reference to the figures. While the flowchart(s) will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
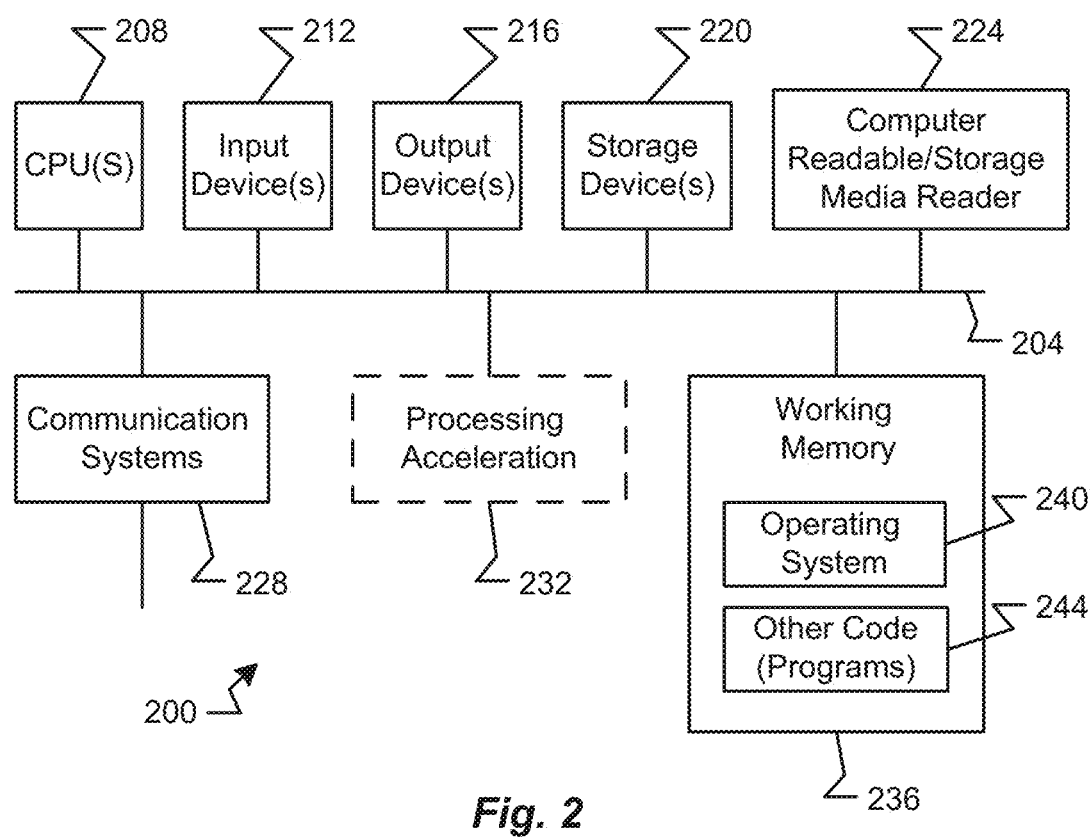
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
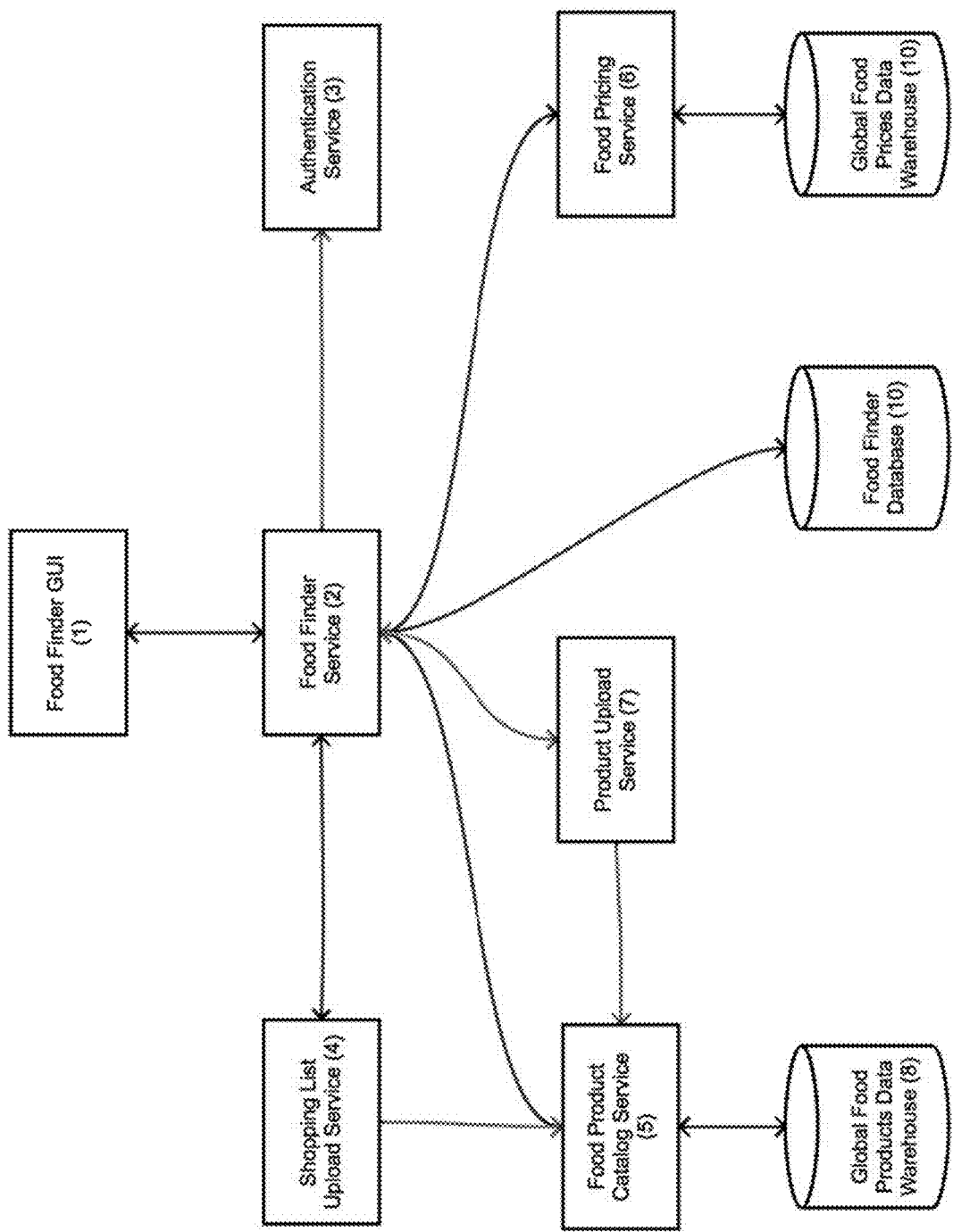
FIG. 3 is a generalized diagram of a system for presenting food product information to a user, according to embodiments of the present invention.

Referring now to FIG. 3, a computer system for delivering to a prospective food buyer comparative food product data for one or more food products from each of a plurality of food sellers is illustrated. The system comprises a buyer application 1 having a GUI, a food product sourcing service 2, an authentication service 3, a shopping list upload service 4, a food product catalog service 5, a food pricing service 6, a product upload service 7, a repository of food product data 8, a repository of buyer data 9, and a repository of food product pricing data 10. Each of the food product sourcing service 2, the authentication service 3, the shopping list upload service 4, the food product catalog service 5, the food pricing service 6, and the product upload service 7 is embodied within a server; in some embodiments any two or more of these elements may be embodied within the same server, while in other embodiments each of these elements may be embodied within a separate server. Furthermore, each pair of the food product catalog service 5 and the repository of food product data 8, the food product sourcing service 2 and the repository of buyer data 9, and/or the food pricing service 6 and the repository of food product pricing data 10 may be embodied in the same device or in separate devices in wired or wireless communication.

A buyer, or potential buyer, of one or more food products may access the buyer application 1 and the GUI thereof, wherein the buyer application 1 may, by way of non-limiting example, take the form of a webpage accessed by a web browser and/or a mobile app. In embodiments, the buyer or potential buyer of the one or more food products may be an individual grocery shopper, a buyer for a restaurant or a kitchen at an institution (a hospital, a prison, a school, etc.), a hospitality professional (e.g. a buyer for a hotel or restaurant), or any other person with an interest in making food purchasing decisions on the basis of comparative food product data.

The buyer application 1 and the GUI thereof may allow the buyer to input, by any one or more means described in greater detail below, any one or more types and/or formats of data corresponding to a food product, or a plurality of food products, the buyer is interested in buying. As a first non-limiting example, the buyer application 1 may allow the buyer to create a shopping list of food products of interest. As a second non-limiting example, the buyer application 1 may present to the buyer, via the GUI, a list and/or map of available food (surplus food, local farmers, grocery stores, etc.) in the user's vicinity that sell one or more items on the buyer's shopping list; the buyer may, in embodiments, be able to filter and/or select or deselect specific food sellers or types of food seller via the buyer application 1. As a third non-limiting example, the buyer application 1 may allow the buyer to add one or more identified food products to a purchase order or "shopping cart," whereby the user may add food products from one seller or more than one seller to the purchase order and transmit the purchase order to a buying and/or delivery service. As a fourth non-limiting example, the buyer application 1 may allow the buyer to identify food products in which the user has an ongoing or repeated interest, and to opt into receiving periodic notifications regarding such food products (e.g. when the food product drops in price, is locally or seasonally available or unavailable, etc.).

The buyer application 1 may enable the buyer to create a shopping list of food products of interest by any of a variety of means. As a first non-limiting example, the buyer application 1 may comprise functionality allowing a user to manually enter, e.g. by clicking or typing, the identities of food products to be added to the shopping list. As a second non-limiting example, the buyer application 1 may comprise functionality allowing a user to communicate to the buyer application 1 a photograph or email of a receipt for a previous food purchase. As a third non-limiting example, the buyer application 1 may comprise functionality allowing the buyer application 1 to interface with, and obtain food product data from, a food shopping browser extension, e.g. the browser extensions described in U.S. Provisional Patent Application 62/721,972, filed 23 Aug. 2018 ("the '972 application," the entirety of which is incorporated herein by reference). As a fourth non-limiting example, the buyer application 1 may comprise functionality allowing a user to communicate to the buyer application 1 a photograph or email of a menu or recipe.

The buyer application 1 may also enable the buyer to provide, via the GUI, various additional information by which the buyer application 1 may (as described in greater detail below) provide more tailored and relevant pricing data to the buyer after calling the food product sourcing service 2. As a first non-limiting example, the buyer may provide, via either manual input or automatic location detection (e.g. IP address or GPS location of the web browser or mobile device the buyer uses to access the buyer application 1), information pertaining to a geographic location of the user. As a second non-limiting example, the buyer may provide information pertaining to certain characteristics the user desires in food products of interest, e.g. local, organic, non-GMO, brand names, nutritional content, packaging type, etc. As a third non-limiting example, the buyer may provide contact information, whereby the buyer application 1 may (as described in greater detail below) periodically query the food sourcing service 2 for information about food products being sold at inexpensive prices and send a communication, e.g. by email or smartphone notification, to the user to inform the user about such food products. As a fourth non-limiting example, the buyer may provide (and/or the buyer application 1 may automatically generate) information pertaining to food products that the buyer has not previously bought but that the buyer may have interest in buying in the future. As a fifth non-limiting example, the buyer may provide to the buyer application 1 information pertaining to a desired, minimum, and/or maximum quantity of any of the one or more food products on the buyer's shopping list. As a sixth non-limiting example, the buyer may provide to the buyer application 1 information pertaining to whether the buyer intends to pick up the one or more food products on the buyer's shopping list, or whether the buyer wishes to have the food products delivered. As a seventh non-limiting example, the buyer may provide to the buyer application 1 pertaining to a frequency (weekly, biweekly, etc.) with which the buyer buys or intends to buy any of the one or more food product's on the buyer's shopping list.

Where the buyer application 1 is a web application, users may access the web application from any suitable web browser in conjunction with which the web application is adapted and/or configured to run, including but not limited to Google Chrome, Internet Explorer, Mozilla Firefox, and Safari. Additionally and/or alternatively, where the buyer application 1 is a mobile application, users may download and install the mobile application from any suitable source, including, by way of non-limiting example, via a web browser or a mobile application marketplace.

Referring now to FIG. 4, an exemplary GUI of the buyer application 1 is illustrated. In this instantiation, the buyer application 1 permits the user to input desired food products into the user's shopping list via the GUI of the buyer application 1. In this non-limiting example, the user may specify a product identity (ground beef, chicken breast, etc.), a desired quantity, a purchase frequency, one or more food product characteristics (organic, non-GMO, etc.), notification preferences, and brand preferences for each of the one or more food products the user wishes to include in the shopping list. As can be seen from the "tabs" near a top of the GUI, the buyer application 1 may offer several different GUI instantiations, as described in greater detail with respect to FIGS. 3 and 4 below.

Referring again to FIG. 3, the buyer application 1, upon initial use by a particular user, generally queries the user for information that may be used to identify the user to any one or more of the food product sourcing service 2, the authentication service 3, the shopping list upload service 4, the food product catalog service 5, the food pricing service 6, and the product upload service 7. This identifying information may, in various embodiments, include any one or more of an API key, an email address, a mailing address or a part thereof (such as a city and state and/or ZIP code), a telephone number, and/or a unique user identifier. The buyer application 1 then stores this identifying information so that the user may be identifiable to the system whenever the user opens the buyer application 1. As described in greater detail below, any one or more of the food product sourcing service 2, the authentication service 3, the shopping list upload service 4, the food product catalog service 5, the food pricing service 6, and the product upload service 7 may use the identifying information to pair the user with relevant food products and food product suppliers.

The buyer application 1 and various other components of the system may be configured or adapted to allow a single user to be identified on any of several various devices by the use of the identifying information provided to the food product sourcing service 2. By way of non-limiting example, a single user account, linked with identifying information associated with a specific individual user, may be accessible, simultaneously or otherwise, from a home computer, a work computer, and a mobile device, any of which may run a suitable embodiment of the buyer application 1. In this way, any user can easily utilize the system from any conveniently accessible device, because his or her identifying information "follows" him or her.

The food product sourcing service 2 is a web service, application programming interface (API), or similar service hosted on a computer remote from the user computer on which the buyer application 1 is running. The purpose of the food product sourcing service 2 is to automatically collect, parse, and transmit the various signals and forms of data necessary to present comparative food product data in a graphical user interface (GUI) of the buyer application 1, and/or to facilitate a transaction of at least one food product in an electronic exchange via the buyer application 1. When commanded to do so by a buyer, the buyer application 1 calls the food product sourcing service 2 and transmits to the food product sourcing service 2 the buyer's shopping list or a portion thereof, which prompts the food product sourcing service 2 to generate and/or collect from other services the information necessary to provide and display the comparative food product data in the GUI of the buyer application 1.

In some embodiments, the buyer application 1 may be configured, either automatically or based on an input by the user, to call the food product sourcing service 2 at regular intervals, e.g. at least once per week, at least once per day, and/or at least once per hour, to obtain comparative food product data or a subtype thereof (e.g. comparative food product pricing data) pertaining to one or more food products. The buyer application 1 may also be configurable to provide an alert to a user based on predetermined criteria, e.g. when a change in the price of a food product exceeds a predetermined threshold.

Whether generated automatically or based on inputs by the user, the request for comparative food product data contained in the call by the buyer application 1 to the food product sourcing service 2 comprises at least one request parameter, which typically represents information pertaining to at least one food product or to a potential purchase or sale thereof. By way of non-limiting example, request parameters included in the request may include a food product name, a food product price class (e.g. corresponding to whether the user desires to buy the food product in the retail, wholesale, and/or commodity market), a date, a season (e.g. winter, spring, summer, fall), a food product weight, a food product age, a food product quality parameter (e.g. corresponding to an industry standard food quality grade, such as a #1, #2, or #3 grade for tomatoes, or a qualitative description of the desirability of the food product), a geographic identifier corresponding to a location of the user, and one or more other food product characteristics. The request parameters may comprise, or may be contained within, an image file (JPG, BMP, etc., e.g. a photograph of a receipt, recipe, or menu), a PDF file, an XLS or XLSX file, an email message file, and the like. Generally, the call by the buyer application 1 to the food product sourcing service 2 can take the form of a call to a secure representational state transfer (REST) service via any standard protocol for invoking a REST service, including but not limited to a request for a JavaScript Open Notation (JSON) file, but other suitable software architectures and data interchange formats will be apparent to those of ordinary skill in the art and are within the scope of the present disclosure.

It is to be expressly understood that the buyer application 1 may (but need not) be, and/or the food product sourcing service 2 may (but need not) be configured to operate in conjunction with, a browser extension of a web browser of the user that provides food purchasing information to the user while the user browses a food purchasing website. A non-limiting example of such a browser extension is described in the '972 application.

Upon receiving the request for comparative food product data from the buyer application 1, the food product sourcing service 2 first evaluates credentials of the user sent by the buyer application 1 by passing the credentials to an authentication service 3, which validates that the request originates from a valid requestor by means of a secure authentication standard, such as, by way of non-limiting example, OAuth and/or Security Assertion Markup Language (SAML). Once the food product sourcing service 2 receives the validation from the authentication service 3, it then begins generating, receiving, requesting, and/or transmitting the information necessary to respond to the request and provide comparative food product data to the user via the GUI of the buyer application 1, as described in further detail below. Upon receiving the validation from the authentication service 3, the food product sourcing service may, but need not, store the user's shopping list or other data pertaining to the user in the repository of buyer data 9

First, the food product sourcing service 2 communicates some or all of the request parameters, and/or a file (image, PDF, XLS or XLSX, email message, etc.) containing some or all of the request parameters, to the shopping list upload service 4. The shopping list upload service 4 applies an algorithm to the relevant request parameters (first parsing, if necessary, the file containing the request parameters to determine the request parameters, according to an algorithm) to convert the request parameters into standard formats and values and consistent units of measure, so as to allow any one or more of the food product sourcing service 2, the food product catalog service 5, the food pricing service 6, and the product upload service 7 to filter and/or sort variables and data pertaining to the one or more food products that are the subject(s) of the request in a consistent manner and compare and/or contrast similar and/or different food products. By way of non-limiting example, if any one or more of the food product sourcing service 2, the food product catalog service 5, the food pricing service 6, and the product upload service 7 are configured to require that a food product weight be input in units of ounces and a request parameter communicated from the buyer application 1 to the shopping list upload service 4 via the food product sourcing service 2 is expressed in units of pounds, the shopping list upload service 4 may apply an algorithm to cover the food product weight from pounds (e.g. three pounds) to the equivalent in ounces (e.g. 48 ounces). After parsing (if necessary) and normalizing the request parameters, the shopping list upload service 4 then passes the normalized request parameters back to the food product sourcing service 2.

The shopping list upload service 4 typically parses the file containing the request parameters by first identifying a product description. Requests for comparative food product data are not usually well-structured or normalized, but typically include a "free-form" product description (i.e., a description of product characteristics in a narrative form that need not, and typically does not, follow any consistent, defined, or formal structure), so the shopping list upload service 4 is operable to extract one or more request parameters selected from the group consisting of a product category, a set of one or more product characteristics, a brand, and a package weight and/or size from the product description contained within the file embodying the request for comparative food product data and thus convert the "free-form" product description into a set of request parameters that can be used by the food product sourcing service 2 to construct a data structure that can be used to identify and present alternatives. In a typical embodiment, the parsing algorithm embodied in the shopping list upload service 4 includes any one or more of the four steps of (1) matching keywords in the product description to a known food taxonomy and/or set of food characteristics, (2) applying regular expression pattern matching to parse common package weight and/or package size parameters from the product description, (3) applying a machine learning word vector algorithm to identify a category of food products with which the product description matches, and (4) instead of or in addition to the machine learning word vector algorithm of (3), utilizing a large language model to identify a category of food products with which the product description matches. In an illustrative and non-limiting example, a request for comparative food product data may contain a product description in the form of the text string "12 1-lb packs frozen Jimmy Dean lean pork sausage patties." Using the four steps noted above, the shopping list upload service 4 may convert the product description into a set of discrete request parameters, e.g., "category: sausage," "brand: jimmy dean," "characteristics: [lean, frozen, patties, pork]," and so on.

The shopping list upload service 4 also, where necessary, normalizes the request parameters parsed from the request for comparative food product data into standard formats and values and consistent units of measure, so as to allow any one or more of the food product sourcing service 2, the food product catalog service 5, the food pricing service 6, and the product upload service 7 to filter and/or sort variables and data pertaining to the one or more food products that are the subject(s) of the request in a consistent manner and compare and/or contrast similar and/or different food products. In a typical embodiment, the normalizing algorithm embodied in the shopping list upload service 4 includes any one or more of the four steps of (1) matching keywords in the product description to a known food taxonomy and/or set of food characteristics, (2) applying regular expression pattern matching to parse common package weight and/or package size parameters from the product description, (3) applying a machine learning word vector algorithm to identify a category of food products with which the product description matches, and (4) instead of or in addition to the machine learning word vector algorithm of (3), utilizing a large language model to identify a category of food products with which the product description matches. In an illustrative and non-limiting example, if the product description consists of the text string "Twelve 1 #packages of fzn Jimmie Dean ln pork patty," the shopping list upload service 4 may use the four steps noted above to normalize the product count (input in the request as "Twelve") to 12 and the product weight (input in the request as "1 #") to 16 ounces, and may further normalize the request parameters in other ways (e.g., normalizing a product type parameter as one of a list of predefined product types such as "sausage" or "breakfast sausage," normalizing a set of product characteristics to elements from a list of predefined product characteristics (e.g., "frozen," "lean," "pork," and "patties"), normalizing the misspelled brand name "Jimmie Dean" to a recognized brand name ("Jimmy Dean") from a predefined list of brand names, and so on).

Upon receiving the normalized request parameters from the shopping list upload service 4, the food product sourcing service 2 constructs a data structure comprising the normalized request parameters and stores this data structure in a computer memory; in the examples listed in the two preceding paragraphs, the data structure may, for example, be the text string "{category: sausage, brand: jimmy dean, characteristics: [lean, frozen, patties, pork], weight: 16 oz, quantity: 12}." Storing the data structure in a computer memory allows the food product sourcing service 2 to subsequently and asynchronously send the data structure, or a portion of the data structure comprising one or more normalized request parameters, to one or more of the food product catalog service 5, the product upload service 7, the food pricing service 6, and the repository of buyer data 9.

The food product sourcing service 2 then passes the normalized request parameters to the food product catalog service 5, which evaluates the normalized request parameters and matches or pairs any one or more of the normalized request parameters to parameters pertaining to one or more food products offered for sale whose characteristics have been input or uploaded to the food product catalog service 5 or a repository of food product data 8 associated therewith. The food product catalog service 5 then returns the parameters pertaining to the one or more food products back to the food product sourcing service 2. In this way, the food product sourcing service 2 receives from the food product catalog service 5 information pertaining to one or more food products that are relevant to the user's request, which may enable the user and/or the food product sourcing service 2 to compare the one or more food products to each other and/or to the parameters of the user's request. The evaluation of food product parameters undertaken by the food product catalog service 5 may be accomplished by any one or more suitable means, including but not limited to lookup tables and machine learning.

The food product sourcing service 2 then passes the parameters returned by the food product catalog service 5 to the food pricing service 6, which evaluates the parameters and returns to the food product sourcing service 2 a price corresponding to each of the one or more food products for sale identified by the food product catalog service 5. The food pricing service 6 may determine prices for the food products identified by the food product catalog service 5 by any one or more suitable means, including but not limited to lookup tables and machine learning, and may (but need not) be operatively interconnected to a repository of food product pricing data 10. The food pricing service 6 and/or the repository of food product pricing data 10 may comprise a food pricing engine or a part of a food pricing engine, such as the food pricing engines disclosed in U.S. Provisional Patent Application 62/767,834, filed 15 Nov. 2018, the entirety of which is incorporated herein by reference.

Optionally, systems of the present invention may also comprise a product upload service 7. The product upload service 7 may comprise functionality allowing a seller or supplier of food, such as a farmer or rancher, to upload to the system (e.g. via a webpage or mobile application) data pertaining to food products the seller or supplier wishes to offer for sale and make available to buyers using the buyer application 1. The product upload service 7 may then communicate these food product data to any one or more of the food product catalog service 5, the repository of food product data 8 associated therewith, the food pricing service 6, and/or the repository of food product pricing data 10 associated therewith, thereby allowing the food product catalog service 5 and/or the food pricing service 6 to "see" the seller or supplier's food products.

After receiving food product parameters from the food product catalog service 5 and food product prices from the food product pricing service 6, the food product sourcing service 2 communicates the food product parameters and the food product prices to the buyer application 1 and displays the food product parameters and the food product prices in the GUI of the buyer application 1.

Figure 5:
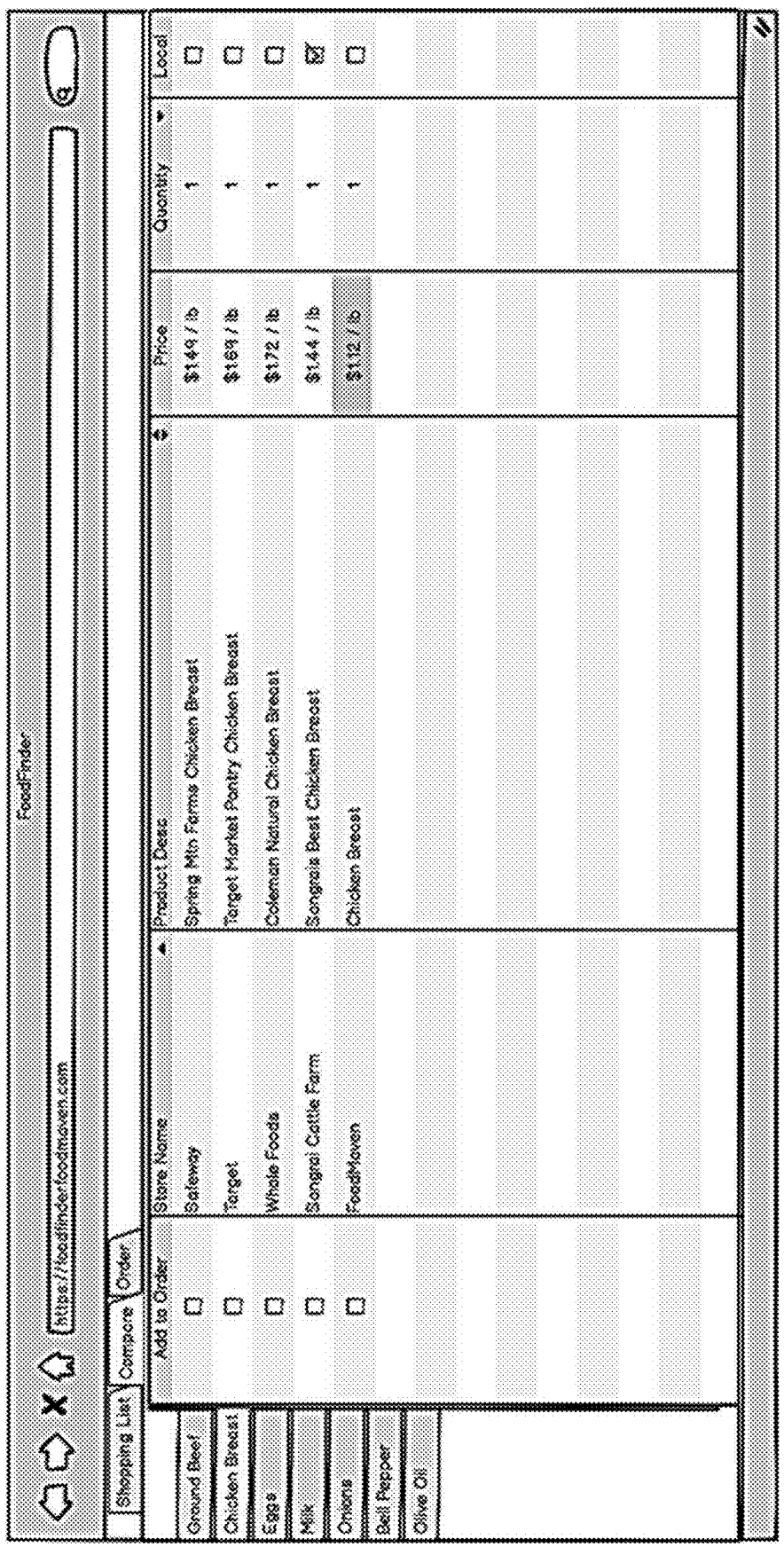
FIG. 5 is a second exemplary instantiation of a graphical user interface (GUI) of a web or mobile application, according to embodiments of the present invention.

Referring now to FIG. 5, an exemplary GUI of the buyer application 1 is illustrated. In this instantiation, the food product sourcing service 2 has returned to the buyer application 1 parameters and prices pertaining to food products for sale that match the user's request. As shown, for each of the food products requested by the user in the shopping list (FIG. 4), the buyer application 1 displays prices and characteristics for each of a plurality of food products offered by an individual supplier, and the option to add each food product to a purchase order. The buyer may thus view all of the individual food products being offered for sale in the buyer's vicinity and select one or more of the individual food products for purchase based on comparative food product data.

Referring now to FIG. 6, an exemplary GUI of the buyer application 1 is illustrated. In this instantiation, the buyer has selected various food products identified by the food product sourcing service 2 and presented for comparison (FIG. 5) for purchase, and added the food products to a purchase order. In embodiments, and as shown in FIG. 6, the buyer application 1 may comprise functionality allowing the purchase order to be saved (e.g. to the repository of buyer data 9 or as a PDF to a local computer), printed, or submitted to an electronic exchange whereby the identified food products will be purchased on the buyer's behalf Additionally or alternatively, the buyer application 1 may provide functionality, e.g. hyperlinks to a food supplier webpage, allowing the buyer to buy each selected food product individually. The electronic exchange may be the same as or similar to electronic exchanges for food products as disclosed in the '972 application.

Figure 7:
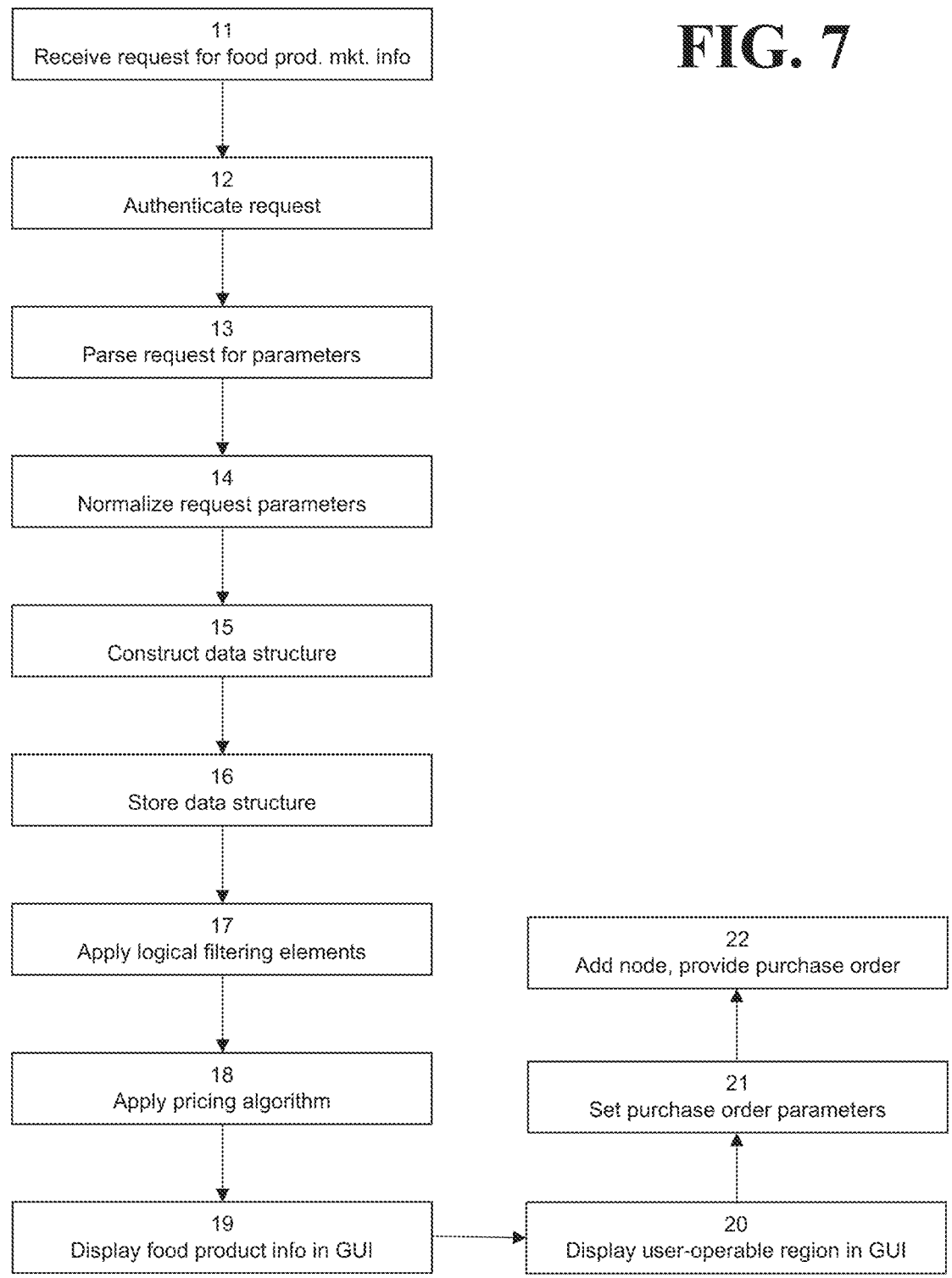
FIG. 7 is a flowchart illustrating method steps for displaying market information relating to a food product in a graphical user interface, according to embodiments of the present invention.

Referring now to FIG. 7, the interactions between the buyer application 1, the food product sourcing service 2, the authentication service 3, the shopping list upload service 4, the food product catalog service 5, the food pricing service 6, and the product upload service 7 are illustrated in more detail. Specifically, these interactions form a method comprising at least a first step 11, a second step 12, a third step 13, a fourth step 14, a fifth step 15, a sixth step 16, a seventh step 17, an eighth step 18, a ninth step 19, a tenth step 20, an eleventh step 21, and a twelfth step 22.

In the first step 11, a request for comparative food product data is received. Generally, the call by the buyer application 1 to the food product sourcing service 2 can take the form of a call to a secure representational state transfer (REST) service via any standard protocol for invoking a REST service, including but not limited to a request for a JavaScript Open Notation (JSON) file, but other suitable software architectures and data interchange formats will be apparent to those of ordinary skill in the art and are within the scope of the present disclosure.

In the second step 12, the request is authenticated. Upon receiving the request for comparative food product data from the buyer application 1, the food product sourcing service 2 first evaluates credentials of the user sent by the buyer application 1 by passing the credentials to an authentication service 3, which validates that the request originates from a valid requestor by means of a secure authentication standard, such as, by way of non-limiting example, OAuth and/or Security Assertion Markup Language (SAML).

In the third step 13, the request is parsed to determine request parameters. Whether generated automatically or based on inputs by the user, the request for comparative food product data contained in the call by the buyer application 1 to the food product sourcing service 2 comprises at least one request parameter, which typically represents information pertaining to at least one food product or to a potential purchase or sale thereof. By way of non-limiting example, request parameters included in the request may include a food product name, a food product price class (e.g. corresponding to whether the user desires to buy the food product in the retail, wholesale, and/or commodity market), a date, a season (e.g. winter, spring, summer, fall), a food product weight, a food product age, a food product quality parameter (e.g. corresponding to an industry standard food quality grade, such as a #1, #2, or #3 grade for tomatoes, or a qualitative description of the desirability of the food product), a geographic identifier corresponding to a location of the user, and one or more other food product characteristics. The request parameters may comprise, or may be contained within, an image file (JPG, BMP, etc., e.g. a photograph of a receipt, recipe, or menu), a PDF file, an XLS or XLSX file, an email message file, and the like.

The third step 13 typically begins by identifying a product description. Requests for comparative food product data are not usually well-structured or normalized, but typically include a "free-form" product description (i.e., a description of product characteristics in a narrative form that need not, and typically does not, follow any consistent, defined, or formal structure), so, in the third step 13, one or more request parameters selected from the group consisting of a product category, a set of one or more product characteristics, a brand, and a package weight and/or size are extracted from the product description contained within the file embodying the request for comparative food product data; the "free-form" product description is thus converted into a set of request parameters that can be used to construct a data structure that can be used to identify and present alternatives. In a typical embodiment, the third step 13 includes any one or more of the four sub-steps of (1) matching keywords in the product description to a known food taxonomy and/or set of food characteristics, (2) applying regular expression pattern matching to parse common package weight and/or package size parameters from the product description, (3) applying a machine learning word vector algorithm to identify a category of food products with which the product description matches, and (4) instead of or in addition to the machine learning word vector algorithm of (3), utilizing a large language model to identify a category of food products with which the product description matches. In an illustrative and non-limiting example, a request for comparative food product data may contain a product description in the form of the text string "12 1-lb packs frozen Jimmy Dean lean pork sausage patties." Using the four sub-steps noted above, this product description may be converted, in the third step 13 of the method, into a set of discrete request parameters, e.g., "category: sausage," "brand: jimmy dean," "characteristics: [lean, frozen, patties, pork]," and so on. In the fourth step 14, the request parameters are normalized. The food product sourcing service 2 communicates some or all of the request parameters, and/or a file (image, PDF, XLS or XLSX, email message, etc.) containing some or all of the request parameters, to the shopping list upload service 4. The shopping list upload service 4 applies an algorithm to the relevant request parameters (first parsing, if necessary, the file containing the request parameters to determine the request parameters, according to an algorithm) to convert the request parameters into standard formats and values and consistent units of measure, so as to allow any one or more of the food product sourcing service 2, the food product catalog service 5, the food pricing service 6, and the product upload service 7 to filter and/or sort variables and data pertaining to the one or more food products that are the subject(s) of the request in a consistent manner and compare and/or contrast similar and/or different food products. By way of non-limiting example, if any one or more of the food product sourcing service 2, the food product catalog service 5, the food pricing service 6, and the product upload service 7 are configured to require that a food product weight be input in units of ounces and a request parameter communicated from the buyer application 1 to the shopping list upload service 4 via the food product souring service 2 is expressed in units of pounds, the shopping list upload service 4 may apply an algorithm to conver the food product weight from pounds (e.g. three pounds) to the equivalent in ounces (e.g. 48 ounces). After parsing (if necessary) and normalizing the request parameters, the shopping list upload service 4 then passes the normalized request parameters back to the food product sourcing service 2.

In a typical embodiment, the fourth step 14, which may embodied in hardware and/or software of the shopping list upload service 4, includes any one or more of the four sub-steps of (1) matching keywords in the product description to a known food taxonomy and/or set of food characteristics, (2) applying regular expression pattern matching to parse common package weight and/or package size parameters from the product description, (3) applying a machine learning word vector algorithm to identify a category of food products with which the product description matches, and (4) instead of or in addition to the machine learning word vector algorithm of (3), utilizing a large language model to identify a category of food products with which the product description matches. In an illustrative and non-limiting example, if the product description consists of the text string "Twelve 1 #packages of fzn Jimmie Dean ln pork patty," the shopping list upload service 4 may, in carrying out the fourth step 14, use the four sub-steps noted above to normalize the product count (input in the request as "Twelve") to 12 and the product weight (input in the request as "1 #") to 16 ounces, and may further normalize the request parameters in other ways (e.g., normalizing a product type parameter as one of a list of predefined product types such as "sausage" or "breakfast sausage," normalizing a set of product characteristics to elements from a list of predefined product characteristics (e.g., "frozen," "lean," "pork," and "patties"), normalizing the misspelled brand name "Jimmie Dean" to a recognized brand name ("Jimmy Dean") from a predefined list of brand names, and so on).

In fifth and sixth steps 15 and 16, a data structure is constructed and stored. The food product sourcing service 2 constructs a data structure comprising the normalized request parameters and stores this data structure in a computer memory; in the examples listed in the four preceding paragraphs, the data structure may, for example, be the text string "{category: sausage, brand: jimmy dean, characteristics: [lean, frozen, patties, pork], weight: 16 oz, quantity: 12}." Storing the data structure in a computer memory allows the food product sourcing service 2 to subsequently and asynchronously send the data structure, or a portion of the data structure comprising one or more normalized request parameters, to one or more of the food product catalog service 5, the product upload service 7, the food pricing service 6, and the repository of buyer data 9.

In the seventh step 17, logical filtering elements are applied to one or more of the normalized request parameters. The food product catalog service 5 evaluates the normalized request parameters and matches or pairs any one or more of the normalized request parameters to parameters pertaining to one or more food products offered for sale whose characteristics have been input or uploaded to the food product catalog service 5 or a repository of food product data 8 associated therewith. The food product catalog service 5 then returns the parameters pertaining to the one or more food products back to the food product sourcing service 2. In this way, the food product sourcing service 2 receives from the food product catalog service 5 information pertaining to one or more food products that are relevant to the user's request, which may enable the user and/or the food product sourcing service 2 to compare the one or more food products to each other and/or to the parameters of the user's request. The evaluation of food product parameters undertaken by the food product catalog service 5 may be accomplished by any one or more suitable means, including but not limited to lookup tables and machine learning.

In the eighth step 18, a pricing algorithm is applied. The food pricing service 6 evaluates the parameters and returns to the food product sourcing service 2 a price corresponding to each of the one or more food products for sale identified by the food product catalog service 5. The food pricing service 6 may determine prices for the food products identified by the food product catalog service 5 by any one or more suitable means, including but not limited to lookup tables and machine learning, and may (but need not) be operatively interconnected to a repository of food product pricing data 10. The food pricing service 6 and/or the repository of food product pricing data 10 may comprise a food pricing engine or a part of a food pricing engine, such as the food pricing engines disclosed in U.S. Provisional Patent Application 62/767,834, filed 15 Nov. 2018, the entirety of which is incorporated herein by reference.

In the ninth step 19, food product information is displayed in a graphical user interface (GUI). After receiving food product parameters from the food product catalog service 5 and food product prices from the food product pricing service 6, the food product sourcing service 2 communicates the food product parameters and the food product prices to the buyer application 1 and displays the food product parameters and the food product prices in the GUI of the buyer application 1.

In the tenth step 20, a user-operable region is displayed in the GUI. The food product sourcing service 2 generates an appropriate image redirect response and/or a script response, which will render a requested image, wrap the image with a URL where the user may view and/or purchase the food product, and display the image in a suitable location in the GUI of the buyer application 1. In this way, the user may be enabled to navigate to a URL where the user may view and/or purchase the food product, simply by clicking or otherwise activating the requested image in the buyer application 1.

In the eleventh step 21, purchase order parameters are set. Parameters for a purchase order are set in response to the user clicking or otherwise activating the requested image in the buyer application 1, and another region operable by a user input device is displayed in the graphical user interface of the buyer application 1. This enables the user to submit the purchase order and cause the purchase order to be communicated to a computer of an electronic exchange over a network.

In the twelfth step 22, an electronic exchange is added as a node to the network and the purchase order is provided to the electronic exchange. In response to the user clicking or otherwise activating the user-operable region, the food product sourcing service 2 incorporates a computer of an electronic exchange into the network and electronically communicates the purchase order to the computer of the electronic exchange via the network, thus submitting the purchase order to an electronic exchange whereby the identified food products will be purchased on the buyer's behalf.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for displaying, on a graphical user interface (GUI), comparative food product data relating to and facilitating trading of a food product, comprising:
   (a) receiving, by a food product sourcing server, a request for food product market information comprising a food product description;
   (b) authenticating, by an authentication server, the request according to a secure authentication algorithm;
   (c) parsing, by a list server, the request to identify one or more request parameters contained within the request;
   (d) normalizing, by the list server, the one or more request parameters by converting the one or more request parameters into standard formats and values and consistent units of measure;
   (e) constructing, by the food product sourcing server, one or more data structures, the one or more data structures collectively comprising the normalized request parameters;
   (f) storing, by the food product sourcing server, the one or more data structures in a computer memory;
   (g) applying, by a food product catalog server, a set of logical filtering elements to the normalized request parameters in the one or more data structures to produce filtered food product data, the filtered food product data comprising a food product identifier and an identifier corresponding to a food product supplier;
   (h) applying, by a food pricing server, an algorithm to the food product identifier and the identifier corresponding to the food product supplier to produce a food product price corresponding to the food product and the food product supplier;
   (i) dynamically and selectively displaying, by the food product sourcing server, a first indicator and concealing or displaying a second indicator in a first location of the graphical user interface corresponding to the food product, the first indicator corresponding to the food product price and the second indicator corresponding to another characteristic of the food product;

(j) selectively displaying, by the food product sourcing server, a first region operable by a user input device in the first location;

(k) in response to operation of the first region by the user input device, setting, by the food product sourcing server, a plurality of parameters for a purchase order relating to the food product and displaying a second region operable by a user input device in a second location in the graphical user interface corresponding to the food product; and (l) in response to operation of the second region by the user input device, adding, by the food product sourcing server, an electronic exchange as a node to a network and providing, via the network, the purchase order to the electronic exchange, wherein at least one of steps (c) and (d) comprises one or more sub-steps selected from the group consisting of (i) matching keywords in the food product description to a known food taxonomy or set of food characteristics, (ii) applying regular expression pattern matching to parse a package weight parameter or package size parameter from the food product description, (iii) applying a machine learning word vector algorithm to identify a category of food products with which the food product description matches, and (iv) utilizing a large language model to identify a category of food products with which the food product description matches.

2. The method of claim 1, wherein at least two of the food product sourcing server, the authentication server, the list server, the food product catalog server, and the food pricing server are the same server.

3. The method of claim 1, wherein each of the food product sourcing server, the authentication server, the list server, the food product catalog server, and the food pricing server is a separate server.

4. The method of claim 1, wherein the authentication algorithm is selected from the group consisting of OAuth and SAML.

5. The method of claim 1, wherein at least one of the one or more request parameters is selected from the group consisting of a food product name, a food product price class, a date, a season, a food product weight, a food product age, a food product quality parameter, and a geographic identifier.

6. The method of claim 1, wherein at least one of the following is true:

(i) at least a portion of the set of logical filtering elements applied in step (g) is contained in a lookup table stored in a computer memory; and (ii) the algorithm applied in step (h) comprises using a lookup table stored in a computer memory.

7. The method of claim 1, wherein the algorithm of step (h) comprises a machine learning algorithm.

8. The method of claim 7, wherein the machine learning algorithm is selected from the group consisting of TensorFlow, NaiveBayes, Logistic Regression, and Random Forest.

9. A computer system for facilitating trading of a food product, comprising:

a processor; and a memory coupled with and readable by the processor and storing therein a set of instructions which, when executed by the processor, causes the processor to facilitate trading of a food item by:

(a) receiving, by a food product sourcing server, a request for food product market information comprising a food product description;

(b) authenticating, by an authentication server, the request according to a secure authentication algorithm;

(c) parsing, by a list server, the request to identify one or more request parameters contained within the request;

(d) normalizing, by the list server, the one or more request parameters by converting the one or more request parameters into standard formats and values and consistent units of measure;

(e) constructing, by the food product sourcing server, one or more data structures, the one or more data structures collectively comprising the normalized request parameters;

(f) storing, by the food product sourcing server, the one or more data structures in a computer memory;

(g) applying, by a food product catalog server, a set of logical filtering elements to the normalized request parameters in the one or more data structures to produce filtered food product data, the filtered food product data comprising a food product identifier and an identifier corresponding to a food product supplier;

(h) applying, by a food pricing server, an algorithm to the food product identifier and the identifier corresponding to the food product supplier to produce a food product price corresponding to the food product and the food product supplier;

(i) dynamically and selectively displaying, by the food product sourcing server, a first indicator and concealing or displaying a second indicator in a first location of the graphical user interface corresponding to the food product, the first indicator corresponding to the food product price and the second indicator corresponding to another characteristic of the food product;

(j) selectively displaying, by the food product sourcing server, a first region operable by a user input device in the first location;

(k) in response to operation of the first region by the user input device, setting, by the food product sourcing server, a plurality of parameters for a purchase order relating to the food product and displaying a second region operable by a user input device in a second location in the graphical user interface corresponding to the food product; and (l) in response to operation of the second region by the user input device, adding, by the food product sourcing server, an electronic exchange as a node to a network and providing, via the network, the purchase order to the electronic exchange, wherein at least one of steps (c) and (d) comprises one or more sub-steps selected from the group consisting of (i) matching keywords in the food product description to a known food taxonomy or set of food characteristics, (ii) applying regular expression pattern matching to parse a package weight parameter or package size parameter from the food product description, (iii) applying a machine learning word vector algorithm to identify a category of food products with which the food product description matches, and (iv) utilizing a large language model to identify a category of food products with which the food product description matches.

10. The system of claim 9, wherein at least two of the food product sourcing server, the authentication server, the list server, the food product catalog server, and the food pricing server are the same server.

11. The system of claim 9, wherein each of the food product sourcing server, the authentication server, the list server, the food product catalog server, and the food pricing server is a separate server.

12. The system of claim 9, wherein the authentication algorithm is selected from the group consisting of OAuth and SAML.

13. The system of claim 9, wherein at least one of the one or more request parameters is selected from the group consisting of a food product name, a food product price class, a date, a season, a food product weight, a food product age, a food product quality parameter, and a geographic identifier.

14. The system of claim 9, wherein at least one of the following is true:
- (i) at least a portion of the set of logical filtering elements applied in step (g) is contained in a lookup table stored in a computer memory; and
- (ii) the algorithm applied in step (h) comprises using a lookup table stored in a computer memory.

15. The system of claim 9, wherein the algorithm of step (h) comprises a machine learning algorithm.

16. The system of claim 9, wherein the machine learning algorithm is selected from the group consisting of TensorFlow, NaiveBayes, Logistic Regression, and Random Forest.

* * * * *